United States Patent
Yoon et al.

(10) Patent No.: US 9,467,645 B2
(45) Date of Patent: Oct. 11, 2016

(54) SYSTEM AND METHOD FOR RECOGNIZING PARKING SPACE LINE MARKINGS FOR VEHICLE

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Dae Joong Yoon, Gyeonggi-do (KR); Jae Seob Choi, Gyeonggi-do (KR); Ho Gi Jung, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 503 days.

(21) Appl. No.: 13/728,030

(22) Filed: Dec. 27, 2012

(65) Prior Publication Data

US 2013/0265429 A1     Oct. 10, 2013

(30) Foreign Application Priority Data

Apr. 10, 2012  (KR) .......... 10-2012-0037405

(51) Int. Cl.
| | |
|---|---|
| *H04N 7/00* | (2011.01) |
| *G08G 1/14* | (2006.01) |
| *G06K 9/00* | (2006.01) |
| *G06K 9/46* | (2006.01) |

(52) U.S. Cl.
CPC .......... *H04N 7/002* (2013.01); *G06K 9/00798* (2013.01); *G06K 9/00812* (2013.01); *G06K 9/4604* (2013.01); *G08G 1/14* (2013.01); *G08G 1/143* (2013.01); *G08G 1/147* (2013.01)

(58) Field of Classification Search
CPC ............ G06K 9/00798; G06K 9/00812; G06K 9/4604; G08G 1/14; G08G 1/143; G08G 1/147; H04N 7/002
USPC ................................. 348/148, 932.2
See application file for complete search history.

(56) References Cited

U.S. PATENT DOCUMENTS

| | | | | | |
|---|---|---|---|---|---|
| 6,104,314 | A | * | 8/2000 | Jiang ................ | 340/932.2 |
| 8,134,479 | B2 | * | 3/2012 | Suhr et al. .......... | 340/932.2 |
| 2005/0225439 | A1 | * | 10/2005 | Watanabe et al. ...... | 340/435 |
| 2006/0088190 | A1 | * | 4/2006 | Chinomi ............ | 382/104 |
| 2008/0136673 | A1 | * | 6/2008 | Jung ................ | 340/932.2 |
| 2009/0207045 | A1 | * | 8/2009 | Jung ................ | 340/932.2 |
| 2013/0258107 | A1 | * | 10/2013 | Delibaltov et al. ...... | 348/148 |
| 2014/0112542 | A1 | * | 4/2014 | Choi et al. .......... | 382/104 |

FOREIGN PATENT DOCUMENTS

| | | |
|---|---|---|
| KR | 10-2008-0024776 A | 3/2008 |
| KR | 10-2009-0088210 A | 8/2009 |
| KR | 10-2012-0003053 A | 1/2012 |

OTHER PUBLICATIONS

Jae Kyu Suhr and Ho Gi Jug, "Fully-automatic Recognition of Various Parking Slot Markings in Around View Monitor (AVM) Image Sequences" 2012 15 International IEEE Conference on Intelement Transportation Systems, Ancharage, Alaska, USA, Sep. 16-19, 2012, pp. 1294-1299.*

*Primary Examiner* — Christopher S Kelley
*Assistant Examiner* — Deirdre Beasley
(74) *Attorney, Agent, or Firm* — Mintz Levin Cohn Ferris Glovsky and Popeo, P.C.; Peter F. Corless

* cited by examiner

(57) ABSTRACT

Disclosed is a system and method for recognizing a parking space line marking for a vehicle. In particular, a corner capturing process is configured to capture an angled corner in an image including the parking space line marking, and a cross capturing process is configured to capture a cross point by combining adjacent corners among the captured corners. A space capturing process captures a space which is an end periphery of the parking space line marking by combining the captured cross points. As a result of the above processes, a type selecting process can then select a type of the parking space line marking from the captured space, and a final selection process may select a final space based on the selected type.

13 Claims, 13 Drawing Sheets

SYSTEM AND METHOD FOR RECOGNIZING PARKING SPACE LINE MARKINGS FOR VEHICLE

CROSS-REFERENCE TO RELATED APPLICATION

This application claims under 35 U.S.C. §119(a) the benefit of Korean Patent Application No. 10-2012-0037405 filed on Apr. 10, 2012, the entire contents of which are incorporated herein by reference.

BACKGROUND (a) Technical Field

The present invention relates to a system and method for recognizing a parking space line marking for a vehicle that automatically extracts and recognizes the parking space line markings from an image of a vehicular imaging device, such as a camera, video camera, vision system, etc.

(b) Background Art

In recent years, as user's interest in automatic parking has increased, research in this technology area has begun to play a major role in the business sector and academic sector as well as the research and development sector of the automotive industry. Such an automatic parking system is conventionally made up of three components such as target position designation process, a path planning process, and a path tracking process all of which are executed by a processor that is typically part of a controller installed in the vehicle. Conventional target position designation process may be classified into four categories which include a user-interface based process, an infrastructure based process, a free-space based process, and a parking space line marking based process. Most products produced at present use a user-interface based process or a free-space based process.

The user-interface based process is the most easily implemented and is useful for correction when automatic recognition has failed, but the user must manually operate the system every time and thus it is not a desirable system to most users. The free-space based process uses an ultrasonic sensor to provide a practical solution to the user during parallel parking. However, a the systems error rate during perpendicular parking is unreasonably high in comparison and as a result the targeted parking position is often incorrectly set obliquely depending on the height of the directly adjacent vehicles.

A parking space line marking recognition based process, however, has the following advantages as compared with other processes.

1) The parking space line marking recognition based process can minimize the operation degree of a driver which is a very significant problem in a user-interface based process. 2) Since the free-space based process sets a parking location depending on the height of a directly adjacent vehicle, a target location may be set obliquely. In the parking space line marking recognition process, a target may be set to be accurately arranged between on a parking space line marking lines. 3) Scanning laser radar, short range radar, and stereo camera based processes typically need to include additional sensors, however the parking space line marking recognition process may use an existing rear imaging device. 4) A process using an ultrasonic sensor has a high rate of error during perpendicular parking due to a sensing limit, but the parking space line marking recognition process can be effectively applied during perpendicular parking. 5) A monocular motion stereo based process requires a large amount of computing, but the parking space line marking recognition process may be implemented with a comparatively small amount of computing.

Yet still, the parking space line marking recognition based process can only be used when the parking space line markings are provided. However, most of the time in urban environments (where consumers are most likely to utilize this feature), parking spaces are adequately marked and therefore, this disadvantage is moot. The parking space line marking based process recognizes parking space line markings via only an image sensor as long as an infrastructure is not installed at the time of drawing the parking space line marking.

The parking space line marking based process may be classified into a semi-automatic process requiring a user input for information regarding a parking space and a full-automatic process which does not require user input. The semi-automatic process may be more preferably in terms of a velocity and recognition rate than the full-automatic process because the user inputs additional information related to a parking space and if an automatic recognition system fails, the semi-automatic process may be highly valuable even as a backup tool.

In some system, when the user inputs one point in a zone where the user wants to park the car through a touch screen, a method of recognizing the parking space by a marking line-segment with a directional intensity gradient based on the information is provided. However, this process is applied to only one kind of parking space line marking Therefore, the initial position of two cross points indicating an entrance of the parking zone which the user has requested is input in the touch screen in order to complement it, and a process of recognizing the parking space by template-matching a skeleton of a parking space line marking area acquired through binarization is provided.

The full-automatic process has been developed conventionally in a variety of manners. In some systems, there is provided a process of recognizing the parking space by extracting pixels included in the parking space line marking through a color segmentation process based on a restricted Coulomb energy neural network by using reasoning that the parking space line marking has a predetermined color.

In addition, after 3D reconstruction for a vertical edge in the rear of the vehicle is performed by using a binocular stereo camera, the parking space line marking is identified by using only the pixels that satisfy homography with a ground surface.

Meanwhile, there is provided additionally a process of recognizing the parking space by filtering a Hough space of a bird's-eye view edge image under the assumption that the parking space line marking is configured with two straight lines having a fixed width, which are parallel to each other and a straight line perpendicular thereto. Also there is provided a process of removing an out lying marking and detecting a straight line through an improved random sample consensus algorithm after continuously calculating a virtual target position based on a vehicle position and a deflection angle just before the vehicle starts moving rearward for parking. However, the existing full-automatic processes assume that there is only one type of parking space and thus is limited in its adaptability to unconventional spaces.

The description provided above as a related art is just for helping understanding the background of the present invention and should not be construed as being included in the related art known by those skilled in the art.

SUMMARY OF THE DISCLOSURE

The present invention provides a system and method for recognizing parking space line markings for a vehicle that can be automatically and dynamically applied to various parking space line markings without instructions or input from a user through an imaging device image installed in the vehicle.

An exemplary embodiment of the present invention provides a method for recognizing one or more parking space line markings for a vehicle which is executed on a processor, including: a corner capturing process configured to capture an angled corner in an image including the one or more parking space line markings; a cross capturing process configured to capture a cross point by combining adjacent corners among the captured corners; a space capturing process configured to capture a space which is an end periphery of the one or more parking space line markings by combining the captured cross points; a type selecting process configured to select a type parking space line marking from the captured space; and a final selection process configured to select a final space based on the selected type of parking space line marking.

The method for recognizing a parking space line marking for a vehicle may further include an image extraction process configured to extract the image including the one or more parking space line markings from an imaging device installed on the outer periphery of the vehicle in a bird's eye view format. In the image extraction process, an image of a fish's eye view format extracted from the vehicular imaging device may be converted into the bird's eye view format.

In the corner capturing process, the type of the corner captured according to an angle of an arc included in the corner in a circle having a radius smaller than the width of a parking space line marking may be discriminated by the process. Additionally, the corner may be classified into multiple different types of corners selected from a plurality of angles selected among 45°, 60°, 90°, 120°, 135°, and 270°. Likewise, the cross point may be classified into multiple different types of cross points selected from a group consisting of a T type, an L type, a Y type, and an I type.

Further, in some exemplary embodiments of the present invention, a boundary between a parking space line marking and a road may be expressed as a vector depending on a change in brightness. Along these lines, during the cross capturing process, the cross point may be classified, as mentioned above, into either a T type, the L type, the Y type, and the I type based on the type of the corner that is present, directionality of a vector of a boundary between at least one of the parking space line markings and the road, and a separation distance between adjacent corners. Furthermore, even when a pair of adjacent corners are not captured, the type of cross point may be estimated based on the type of a single corner and the directionality of the vector of the boundary between the parking space line marking and the road.

In the cross capturing process, the cross point may be expressed by the vector through the directionality of the boundary vector between the parking space line marking and the road and in the space capturing process, a directionality of the space is judged based on the vector direction of the cross point to determine whether the captured space is a space at a point where the parking space line marking starts.

In the space capturing process, the space may be classified as either a rectangle or a parallelogram.

In the final selection process, a final space may be selected based on similarities between the parking space line markings types of the captured spaces and brightness levels of the captured spaces.

Another exemplary embodiment of present invention provides a method for recognizing a parking space line marking for a vehicle that is executed by a processor installed in a controller of a vehicle, including: a edge capturing process configured to capture an angled edge in an image including the parking space line marking; a cross capturing process configured to capture a cross point by combining adjacent edges among the captured edges; a space capturing process configured to capture a space which is an end periphery of the parking space line marking by combining the captured cross points; and a final selection process configured to select a final space by comparing brightness of the captured spaces.

Yet another exemplary embodiment of the present invention provides a method for recognizing a parking space line marking for a vehicle, including: capturing, by imaging device system, the corner of the parking space line marking from an image of a vehicular imaging device; capturing, by a processor in the imaging device system, the cross point by combining the adjacent corners; capturing, by the processor, the space which is the end periphery of the parking space line mark by combing the adjacent cross points; and selecting the final space by substituting the captured space into the parking space line marking type which is provided in advance or comparing the brightnesses of the spaces and recognizing the parking space line marking.

Advantageously, the exemplary embodiment of the present invention provides a full-automatic parking space line marking recognition process which can be applied to various parking space line markings. The presented process is based on the fact that various types of parking space line markings are configured in a hierarchical tree structure. Each type of parking space line marking is constituted by a plurality of spaces, the single space is constituted by two cross points, and the single cross point is constituted by a combination of two corners.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
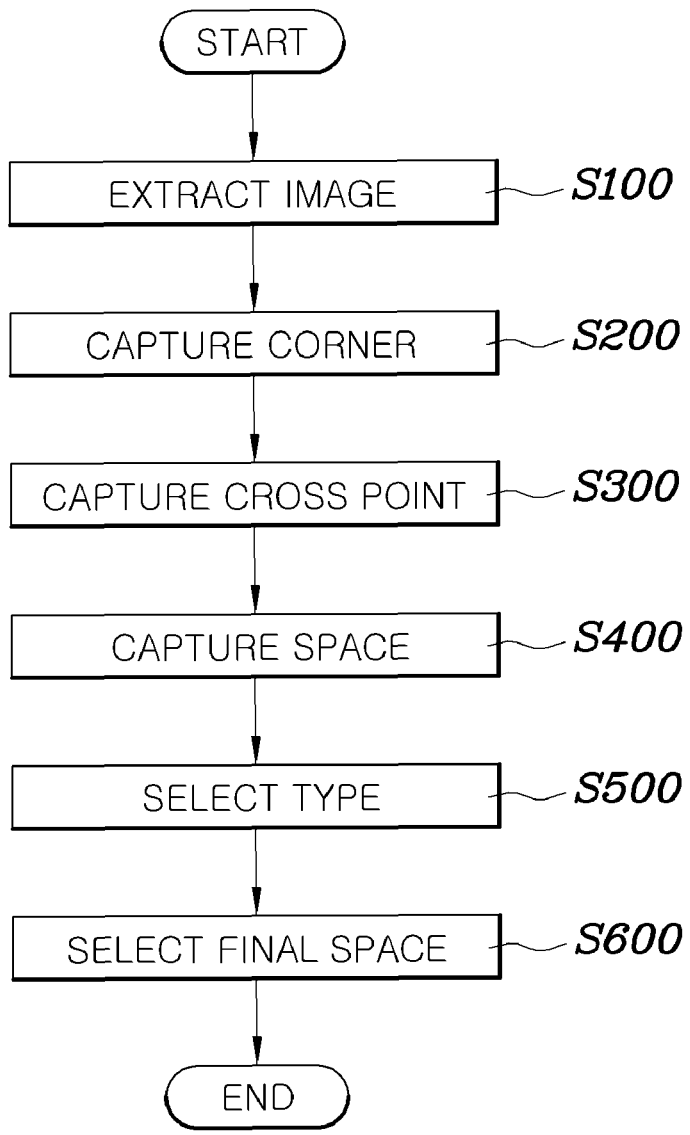
FIG. 1 is a flowchart of a method for recognizing one or more parking space line markings for a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, a system and method for recognizing a parking space line marking for a vehicle according to an exemplary embodiment of the present invention will be described with reference to the accompanying drawings.

FIG. 1 is a flowchart of a process for recognizing a parking space line marking executed by a processor on a controller installed in the vehicle according to an exemplary embodiment of the present invention. This process includes: a corner capturing process (S200) configured to capture an angled corner in an image including the parking space line marking; a cross capturing process (S300) configured to capture a cross point by combining adjacent corners among the captured corners; a space capturing process (S400) configured to capture a space which is an end periphery of the parking space line marking by combining the captured cross points; a type selecting process (S500) configured to select a type of the parking space line marking from the captured space; and a final selection process (S600) configured to select a final space based on the selected type.

The method for recognizing a parking space line marking for a vehicle according to the exemplary embodiment of the present invention uses a photographed image from an imaging device installed in the vehicle, e.g., a rear back up camera. Typically, an image extracted by the imaging device as a fish-eye view image captured by a fish-eye lens is first converted into a bird's eye view. To this end, the method for recognizing a parking space line marking for a vehicle according to the present invention may further include an image extraction process (S100) that is configured to extract the image including the parking space line marking from the imaging device provided in the vehicle in a bird's eye view format. In addition, in the image extraction process, the image of the fish's eye view format extracted from the vehicular imaging device is converted into the bird's eye view format such that the parking space line marking is displayed as if being viewed from above the vehicle and the displayed parking space line marking is thus more easily recognized.

The parking space line marking of the vehicle may be generally be identified based on the corner, the cross point, the space, and the parking space line marking. Therefore, in the method for recognizing a parking space line marking for a vehicle according to the exemplary embodiment of the present invention, the corner is first recognized, then the cross point and the space are identified. Thereafter, as a higher level process, the parking space line marking is identified and a more accurate space is detected to suit a model which becomes a basis thereof so that an accurate parking space line marking recognition is acquired.

Figure 2:
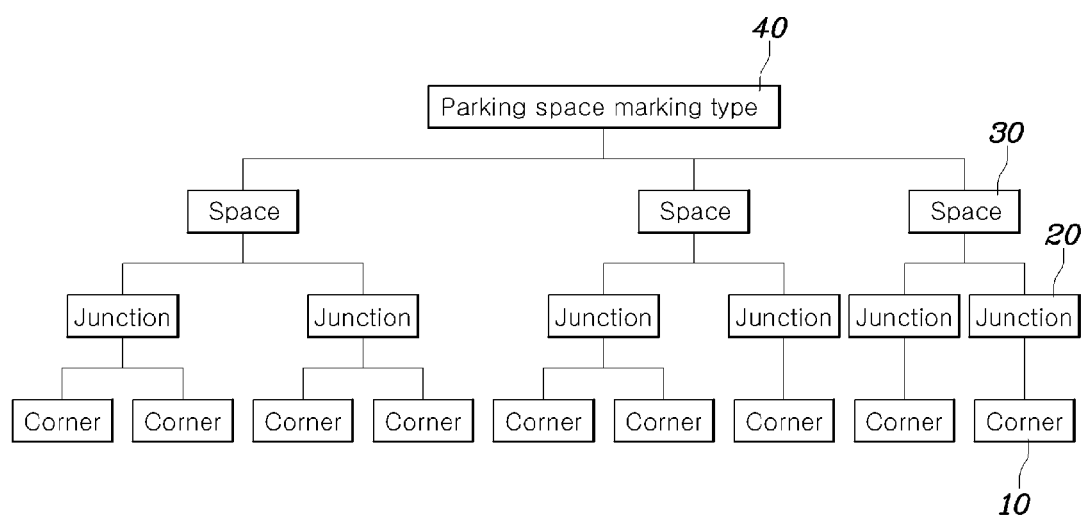
FIG. 2 is a hierarchical diagram of the method for recognizing a parking space line marking for a vehicle according to an exemplary embodiment of the present invention.

FIG. 2 is a hierarchical diagram of the method for recognizing a parking space line marking for a vehicle according to an exemplary embodiment of the present invention. A highest parking space line marking type is constituted by a plurality of spaces, the space is constituted by the cross point, and the cross point is constituted by the corner.

First, in the corner capturing process (S200), the corner's angle is captured in the image including the parking space line marking and in the cross capturing process (S300), the cross point is captured by combining the adjacent corners among the captured corners. In addition, in the space capturing process (S400), the space of the end periphery of the parking space line marking is captured by combining the captured cross points and the type selecting process (S500) configured to select the type of the parking space line marking from the captured space and the final selection process (S600) configured to select the final space based on the selected type are performed.

Figure 3:
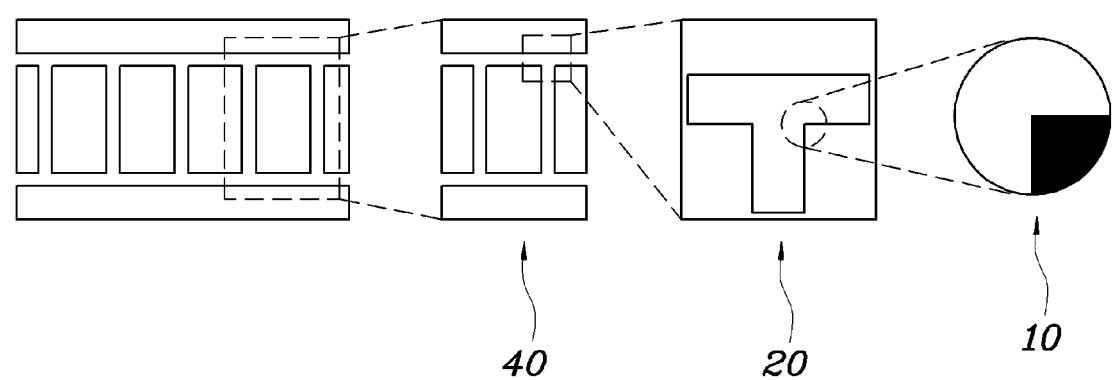
FIG. 3 is a diagram illustrating a recognition process of the method for recognizing a parking space line marking for a vehicle according to the exemplary embodiment of the present invention.

FIG. 3 is a diagram illustrating a recognition process of the method for recognizing a parking space line marking for a vehicle according to the exemplary embodiment of the present invention. A parking space line marking 40 is constituted by the space, the cross point 20, and a pair of corners 10 forming the cross point 20 and the parking space line marking 40 is finally recognized commencing at the corner 10.

FIGS. 4A-D illustrate different types of a plurality of parking space line markings. It is presumed that by analyzing various parking space line marking types of structures, a hierarchical tree structure made up of the type, the space, the cross point, and the corner is configured. As illustrated in FIGS. 4A-D, a method for handling four types that are the most common types among of parking space line markings is provided.

Figure 4A:
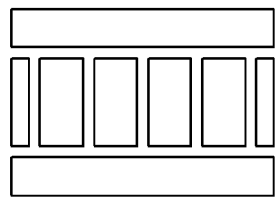
FIGS. 4A-I are diagrams illustrating a recognition process of the method for recognizing a parking space line marking for a vehicle according to the exemplary embodiment of the present invention.
Figure 4B:
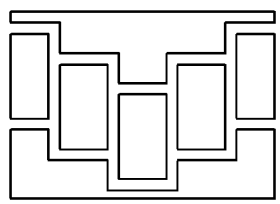
Figure 4C:
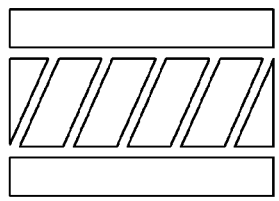
Figure 4D:
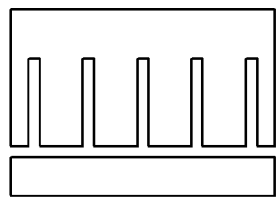
Figure 4E:
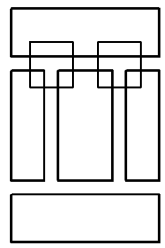
Figure 4F:
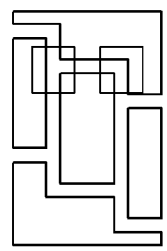
Figure 4G:
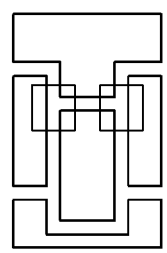
Figure 4H:
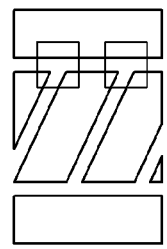
Figure 4I:
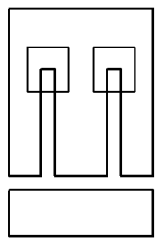
Figure 5A:
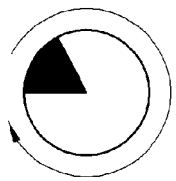
FIGS. 5A-D are diagrams illustrating a corner of the method for recognizing a parking space line marking for a vehicle according to an exemplary embodiment of the present invention.
Figure 5A:
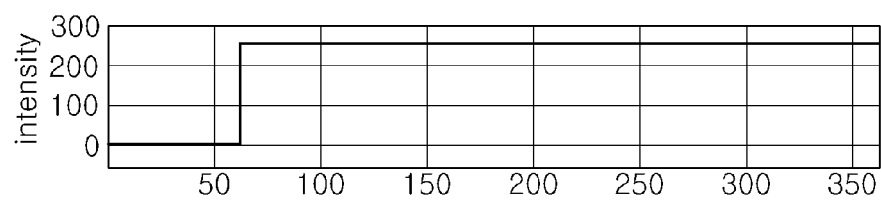
Figure 5B:
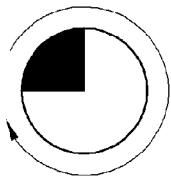
Figure 5B:
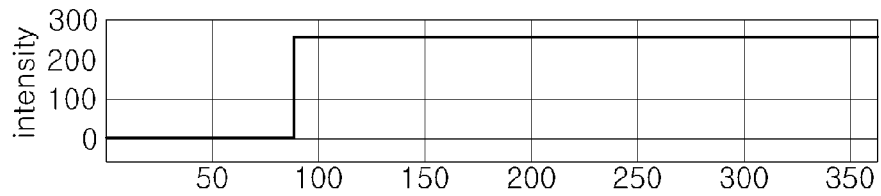
Figure 5C:
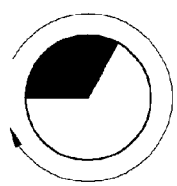
Figure 5C:
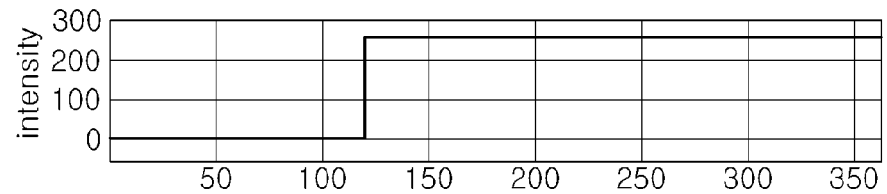
Figure 5D:
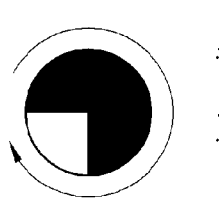
Figure 5D:
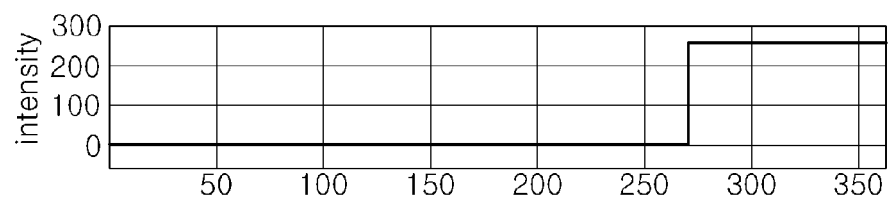
Figure 6A:
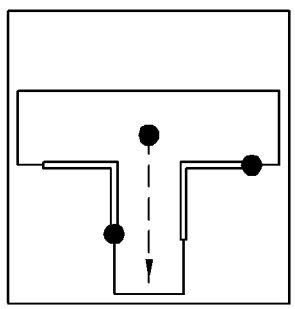
FIGS. 6A-D are diagrams illustrating a cross point of the method for recognizing a parking space line marking for a vehicle according to the exemplary embodiment of the present invention.
Figure 6B:
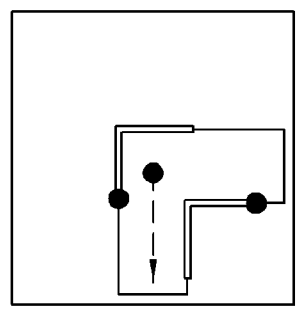
Figure 6C:
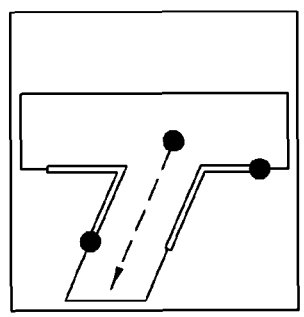
Figure 6D:
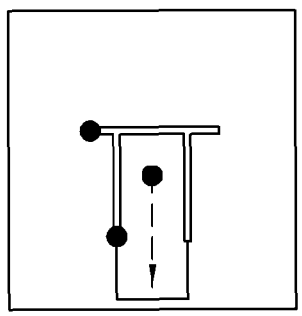

The respective types of the parking space line marking may be named as FIG. 4A—a rectangular type, FIG. 4B—an uneven rectangular type, FIG. 4C—a diamond type, and FIG. 4D—an open rectangular type". These four types of parking space line markings are made up of five possible types of spaces as illustrated FIGS. 4E to 4I and the single space is configured by different combinations of two cross points. In the figures, the respective spaces are illustrated and a cross point pair making up each space is displayed and illustrated in a red color together. These five types of spaces illustrated in FIGS. 4E to 4I are named as a TT-space (FIG. 4E), a TL-space (FIG. 4F), TT'-space (FIG. 4G), an YY-space (FIG. 4H), and an II-space (FIG. 4I), respectively.

In detail, in the corner capturing process (S200) of the method for recognizing a parking space line marking for a vehicle according to the exemplary embodiment of the present invention, a type of the corner captured according to an angle of an arc included in the corner in a circle having a radius that is less than the width of a parking space line of the parking space line marking is discriminated and the corner may be classified as a 60°, 90°, 120°, or 270° corner. In the corner capturing process (S200), a boundary between the parking space line of the parking space line marking and a road may be expressed as a vector depending on a change in brightness. Therefore, in the cross capturing process (S300), the cross point may be classified into types of a T type, an L type, a Y type, and an I type.

In detail, the corners making up the cross point of the space may be classified into one of four types as illustrated in FIG. 5 according to an angle of an arc corresponding to a ground plane when a circle having a smaller radius than the width of the parking space line is drawn at the center. The corners illustrated in FIGS. 5A to 5D have angles of arcs corresponding to respective ground planes, which are 60°, 90°, 120°, and 270°, and as a result, the corners may be named as a 60θ corner, a 90θ corner, a 120θ corner, and a 270θ corner. Of course, the type of the corner may include angles of 45θ and 135θ as well.

Templates of four types of corners are generated on the assumption of a parking space line marking situation in which the brightness on the parking space line marking is 255 and the brightness of the ground plane is 0. Under such conditions, a circular intensity profile of the 60θ corner has a brightness of 0 for 60 (and has a brightness of 255 for 300θ, the circular intensity profile of the 90θ corner has a brightness of 0 for 90θ and a brightness of 255 for 270θ, the circular intensity profile of the 120θ corner has a brightness of 0 for 90θ and a brightness of 255 for 240θ, and the circular intensity profile of the 270θ corner has a brightness of 0 for 270θ and a brightness of 255 for 90θ. That is, when the respective corners are scanned around the center in a clockwise direction, the types of all the respective corners may be detected according to the degree of the angle indicating a difference in brightness.

Figure 7:
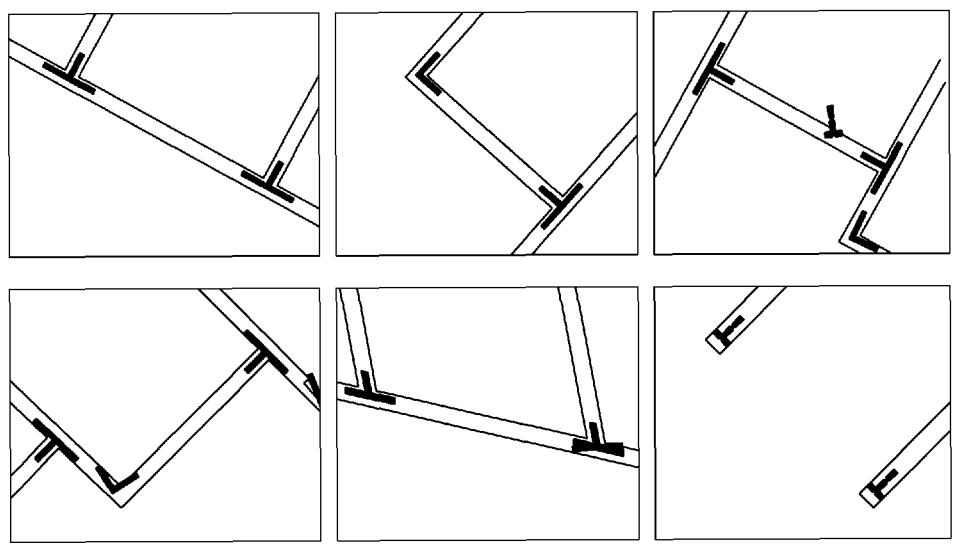
FIG. 7 is a diagram illustrating a cross point of the method for recognizing a parking space line marking for a vehicle according to the exemplary embodiment of the present invention.
Figure 8A:
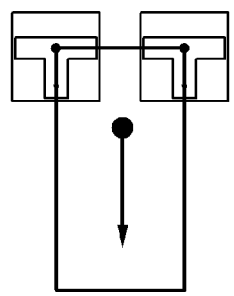
FIGS. 8A-E are diagrams illustrating a space of the method for recognizing a parking space line marking for a vehicle according to an exemplary embodiment of the present invention.
Figure 8A:
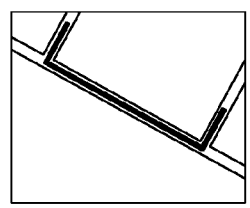
Figure 8B:
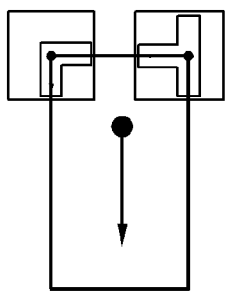
Figure 8B:
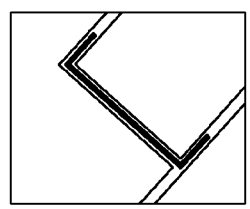
Figure 8C:
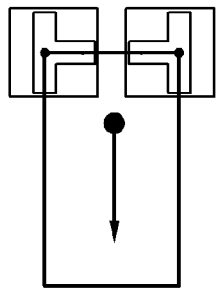
Figure 8C:
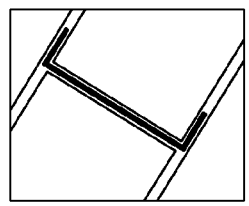
Figure 8D:
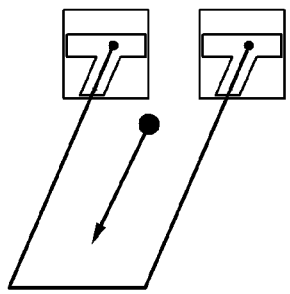
Figure 8D:
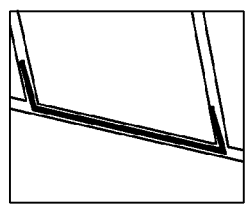
Figure 8E:
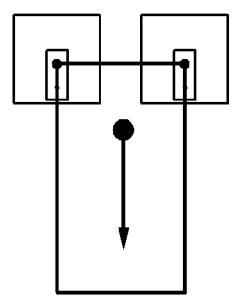
Figure 8E:
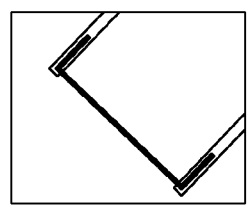
Figure 9A:
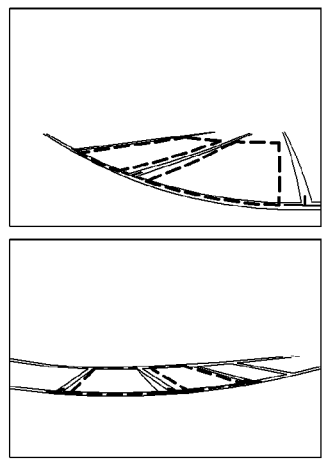
FIGS. 9A-D are diagrams illustrating an implementation example of the method for recognizing a parking space line marking for a vehicle according to an exemplary embodiment of the present invention.
Figure 9B:
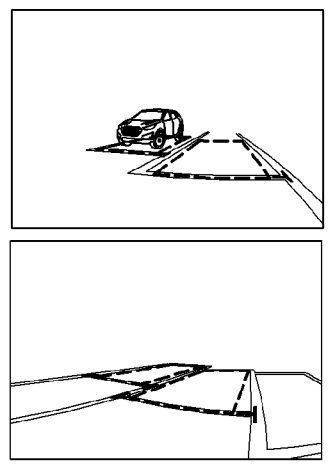
Figure 9C:
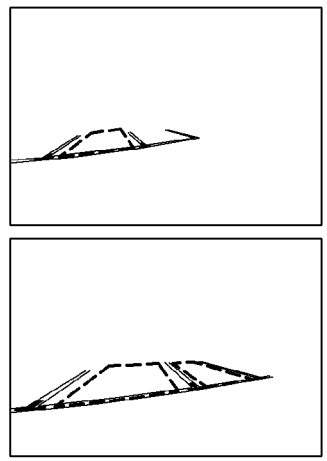
Figure 9D:
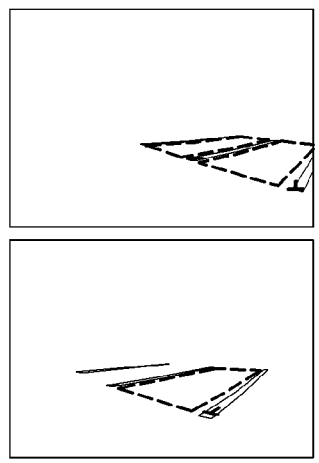

FIGS. 6A-D and 7 are diagrams illustrating a cross point of the method for recognizing a parking space line marking for a vehicle according to the exemplary embodiment of the present invention and the cross point making up the space of the parking space line marking may be classified into four types according to the types and directions of the corners constituting the cross point. The types and directions of the corners constituting each cross point are illustrated in FIG. 6. Line segment pairs drawn by green, red, blue, and black mean the 60θ corner, the 90θ corner, the 120θ corner, and the 270θ corner, respectively and a line segment which ends with the circle and a line segment which does not end with the circle mean W2BTD (a vector of which brightness is changed from white to black) and B2WTD (a vector of which brightness is changed from black to white), respectively and a cross point of both line segments means a position of the corner. A dotted arrow indicates a direction of the cross point and a start point thereof indicates a position of the cross point. FIG. 7 is a diagram illustrating each type of cross point on a parking space line marking line through the analysis.

Therefore, in the cross capturing process (S300), the cross point is classified into the types of the T type, the L type, the Y type, and the I type based on the type of the corner, directionality of a vector of a boundary between the parking space line marking and the road, and a separation distance between adjacent corners and in the cross capturing process (S300), even when a pair of adjacent corners are not captured, the type of the cross point is estimated according to the type of the single corner and the directionality of the vector of the boundary between the parking space line and the road.

To this end, in the cross capturing process (S300), the cross point is expressed by the vector through the directionality of the boundary vector between the parking space line and the road and in the slog capturing process (S400), a direction of the is judged according to the vector direction of the cross point to determine whether the captured space is a space at a point where the parking space line marking starts.

Meanwhile, four conditions should be satisfied in order to generate the cross point from two corners as described below.

1) In the case of a T-cross point: (1) Both corners are the 90°-corners (2) a distance between both corners is spaced apart by the width of the parking space line (3) W2BTD of corner #1 and B2WTD of corner #2 coincide with each other and B2WTD of corner #1 and W2BTD of corner #2 are opposite to each other (4) a vector toward corner #2 from corner #1 is opposite to B2WTD of corner #1 and coincides with W2BTD of corner #2.

2) In the case of an L-cross point: (1) corner #1 is the 90°-corner and corner #2 is the 270°-corner (2) a distance between both corners is spaced apart by a double of the width of the parking space line (3) W2BTD of corner #1 and B2WTD of corner #2 coincide with each other and B2WTD of corner #1 and W2BTD of corner #2 coincide with each other (4) the vector toward corner #2 from corner #1 is different from B2WTD of corner #1 and W2BTD of corner #2 by 45° in the clockwise direction.

3) In the case of a Y-cross point: (1) corner #1 is the 60°-corner and corner #2 is the 120°-corner (2) a distance between both corners is spaced apart by the width of the parking space line (3) B2WTD of corner #1 and W2BTD of corner #2 are opposite to each other and B2WTD of corner #1 and W2BTD of corner #2 are opposite to each other (4) the vector toward corner #2 from corner #1 is opposite to B2WTD of corner #1 and coincides with W2BTD of corner #2.

4) In the case of an I-cross point: (1) Both corners are the 270°-corners (2) a distance between both corners is spaced apart by the width of the parking space line (3) W2BTD of corner #1 and B2WTD of corner #2 coincide with each other and B2WTD of corner #1 and W2BTD of corner #2 are opposite to each other (4) the vector toward corner #2 from corner #1 coincides with B2WTD of corner #1 and is opposite to W2BTD of corner #2.

FIG. 8 is a diagram illustrating a space of the method for recognizing a parking space line marking for a vehicle according to an exemplary embodiment of the present invention. The five types of spaces making up the parking space line marking are classified according to the types and directions of the cross points making them up as illustrated in FIG. 8. In this figure, a rectangle indicates the space generated by both cross points and an arrow marked with a solid line in the rectangle indicates the direction of the space. As a result, two cross points generated from the corners are combined with each other to detect various types of spaces.

A method of configuring the space from two cross points is similar as a method of generating the cross point from two corners. To this end, three types of information (shape, position, and direction) are used. Conditions should be satisfied in order to generate the space from two cross points as described below.

(a) In the case of a TT-space: (1) both cross points are T-cross points (2) a distance between both cross points is spaced apart by the width of the vehicle (3) the directions of both cross points coincide with each other, and (4) a vector that links both cross points is perpendicular to the directions of both cross points.

(b) In the case of an LT-space: (1) cross point #1 is an L-cross point and cross point #2 is a T-cross point (2) a distance between both cross points is spaced apart by the width of the vehicle (3) the directions of both cross points are perpendicular to each other or face each other, and (4) a vector that links both cross points is parallel to the direction of the T-cross point and perpendicular or parallel to the direction of the L-cross point.

(c) In the case of a T'T'-space: (1) both cross points are the T-cross points (2) a distance between both cross points is spaced apart by the width of the vehicle (3) the directions of both cross points are opposite to each other, and (4) a vector that links both cross points faces the directions of both cross points.

(d) In the case of a YY-space: (1) both cross points are Y-cross points (2) a distance between both cross points is spaced apart by a multiple of 1/cos 30 (of the width of the vehicle (3) the directions of both cross points coincide with each other, and (4) a vector that links both cross points is different from the direction of one cross point by 60 (and the direction of the other cross point by 120 (.

(e) In the case of a II-space: (1) both cross points are I-cross points (2) a distance between both cross points is spaced apart by the width of the vehicle (3) the directions of both cross points coincide with each other, and (4) a vector that links both cross points is perpendicular to the directions of both cross points.

That is, in the space capturing process (S400), the space is classified as either a rectangle or a parallelogram and in the final selection process (S600), a final space is selected according to similarity between the parking space line marking types of the captured spaces and brightness levels of the captured spaces.

That is, a brightest space is confirmed as a representative space among a plurality of space candidates detected through cross points with a plurality of corners and the parking space line marking type which coincides with the space is extracted and thereafter, as a result, the parking space line marking is finally recognized. To this end, various general types of parking space line marking types will be stored in advance on a storage device installed in the vehicle, such as a memory or a hard drive.

The present invention presents a method of fully-automatically recognizing various types of parking space line markings. The presented method illustrates that the parking space line marking may be modeled in a hierarchical tree structure made up of levels indicating space-cross point-corner. After the tree structure is configured in a bottom-up direction while over detection is performed based on the presented method, it is verified that an algorithm having high detection rate may be ensured using a simple method by organizing and confirming the tree structure in a top-down method based on a finally set parking space line markings.

In addition, as a result of evaluating the presented method in vehicular rear images photographed under various parking space line marking situations, more accurate and effective detection rate, which is 95.3% better than an existing semi-automatic method is illustrated and a very rapid processing speed of 0.689 seconds is may be provided.

Meanwhile, a method for recognizing a parking space line marking for a vehicle according to another exemplary embodiment of the present invention includes a corner capturing process (S200) configured to capture an angled edge in an image including the parking space line marking; a cross capturing process (S300) configured to capture a cross point by combining adjacent edges among the captured edges; a space capturing process (S400) configured to capture a space which is an end periphery of the parking space line marking by combining the captured cross points; and a final selection process (S600) configured to select a final space by comparing brightnesses of the captured spaces. That is, in the final selection, the parking space line marking is recognized by selecting a brightest space immediately without using a parking space line marking type which is provided in advance.

The method for recognizing a parking space line marking for a vehicle captures the corner of the parking space line marking from an image of a vehicular imaging device, captures the cross point by combining the adjacent corners, captures the space which is the end periphery of the parking space line marking by combing the adjacent cross points, selects the final space by substituting the captured space into the parking space line marking type which is provided in advance or comparing the brightness of the spaces, and recognizes the parking space line marking.

According to a method for recognizing a parking space line marking for a vehicle having the above structure, since a parking space line marking is automatically recognized through an image of an imaging device without an input of a user, a sensor apparatus is not required and a system can be fully automatically implemented. Further, parking space line markings having a variety of situations and shapes can be all recognized by applying recognition of a hierarchical structure type.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A method for recognizing a parking space line marking executed by a processor within a controller installed in a vehicle, comprising:
   a corner capturing process configured to capture an angled corner in an image including the parking space line marking;
   a cross capturing process configured to capture a cross point by combining adjacent corners among the captured corners according to types and directions of captured corners;
   a space capturing process configured to capture a space which is an end periphery of the parking space line marking by combining the captured cross points according to vector directions of the captured cross points;
   a type selecting process configured to select a type of the parking space line marking from the captured space; and
   a final selection process configured to select a final space based on the selected type,
   wherein in the corner capturing process, a boundary between a parking space line of the parking space line marking and a road is expressed as a vector depending on a change in brightness, a type of the corner captured is discriminated according to an angle of an arc which is a portion of a circumference of a circle having a center and a radius less than a width of the parking space line marking, and
   wherein a position of the center of the circle is determined based on a vertex of the boundary, and the arc is a portion of the circle that corresponds to either the road or the parking space line marking.

2. The method for recognizing a parking space line marking for a vehicle of claim 1, further comprising an image extraction process of extracting the image including the parking space line marking from a imaging device installed in the vehicle in a bird's eye view format.

3. The method for recognizing a parking space line marking for a vehicle of claim 2, wherein in the image extraction process, an image having a fish's eye view format extracted from the vehicular imaging device is converted into the bird's eye view format.

4. The method for recognizing a parking space line marking for a vehicle of claim 1, wherein in the corner capturing process, the corner is classified one of a plurality of angles selected from a group consisting of 45°, 60°, 90°, 120°, 135°, and 270°.

5. The method for recognizing a parking space line marking for a vehicle of claim 1, wherein in the cross capturing process, the cross point is classified as a type selected from a group consisting of a T type, an L type, a Y type, and an I type.

6. The method for recognizing a parking space line marking for a vehicle of claim 1, wherein in the cross capturing process, the cross point is classified into one of a plurality of types selected from a group consisting of T type, the L type, the Y type, and the I type based on the angle of the corner, directionality of a vector of a boundary between the parking space line marking and the road, and a separation distance between adjacent corners.

7. The method for recognizing a parking space line marking for a vehicle of claim 6, wherein in the cross capturing process, even when a pair of adjacent corners are not captured, the type of the cross point is estimated according to the angle of a single corner and the directionality of the vector of the boundary between the parking space line marking and the road.

8. The method for recognizing a parking space line marking for a vehicle of claim 6, wherein in the cross capturing process, the cross point is expressed by the vector through the directionality of the boundary vector between the parking space line marking and the road and in the space capturing process, a direction of the space is judged according to the vector direction of the cross point to determine whether the captured space is a location at a point where the parking space line marking starts.

9. The method for recognizing a parking space line marking for a vehicle of claim 1, wherein in the space capturing process, the space is classified as either a rectangle or a parallelogram.

10. The method for recognizing a parking space line marking for a vehicle of claim 1, wherein in the final selection process, a final space is selected according to similarity to the parking space line marking types of the captured spaces and brightness levels of the captured spaces.

11. A method for recognizing a parking space line marking executed by a processor installed in a controller of a vehicle, comprising:
   a corner capturing process configured to capture an angled edge in an image including the parking space line marking;
   a cross capturing process configured to capture a cross point by combining adjacent edges among the captured edges according to types and directions of captured edges;
   a space capturing process configured to capture a space which is an end periphery of the parking space line marking by combining the captured cross points according to vector directions of the captured cross points; and
   a final selection process configured to select a final space by comparing brightnesses of the captured spaces,
   wherein in the corner capturing process, a boundary between a parking space line of the parking space line marking and a road is expressed as a vector depending on a change in brightness, a type of the corner captured is discriminated according to an angle of an arc which is a portion of a circumference of a circle having a center and a radius less than a width of the parking space line marking, and
   wherein a position of the center of the circle is determined based on a vertex of the boundary, and the arc is a portion of the circle that corresponds to either the road or the parking space line marking.

12. A method for recognizing a parking space line marking executed by a processor installed in a controller of a vehicle, comprising:
   capturing a corner of the parking space line marking from an image of a vehicular imaging device;

capturing a cross point by combining adjacent corners among the captured corners according to types and directions of adjacent corners;

capturing a space which is the end periphery of the parking space line marking by combing adjacent cross points among the captured cross points according to vector directions of the adjacent cross points; and selecting the final space by substituting the captured space into the parking space line marking type which is provided in advance, wherein when the parking space line marking is not provided in advance comparing the brightnesses of the spaces and recognizing the parking space line marking, wherein in the corner capturing process, a boundary between a parking space line of the parking space line marking and a road is expressed as a vector depending on a change in brightness, a type of the corner captured is discriminated according to an angle of an arc which is a portion of a circumference of a circle having a center and a radius less than a width of the parking space line marking, and wherein a position of the center of the circle is determined based on a vertex of the boundary, and the arc is a portion of the circle that corresponds to either the road or the parking space line marking.

13. A non-transitory computer readable medium containing program instructions executed by a processor, the computer readable medium comprising:

program instructions that capture an angled corner in an image including the parking space line marking;

program instructions that capture a cross point by combining adjacent corners among the captured corners according to types and directions of captured corners;

program instructions that capture a space which is an end periphery of the parking space line marking by combining the captured cross points according to vector directions of the captured cross points;

program instructions that select a type of the parking space line marking from the captured space; and program instructions that select a final space based on the selected type, wherein the program instructions that capture an angled corner express a boundary between a parking space line of the parking space line marking and a road as a vector depending on a change in brightness, and discriminate a type of the corner captured according to an angle of an arc which is a portion of a circumference of a circle having a center and a radius less than a width of the parking space line marking, and wherein a position of the center of the circle is determined based on a vertex of the boundary, and the arc is a portion of the circle that corresponds to either the road or the parking space line marking.

* * * * *